UNITED STATES PATENT OFFICE.

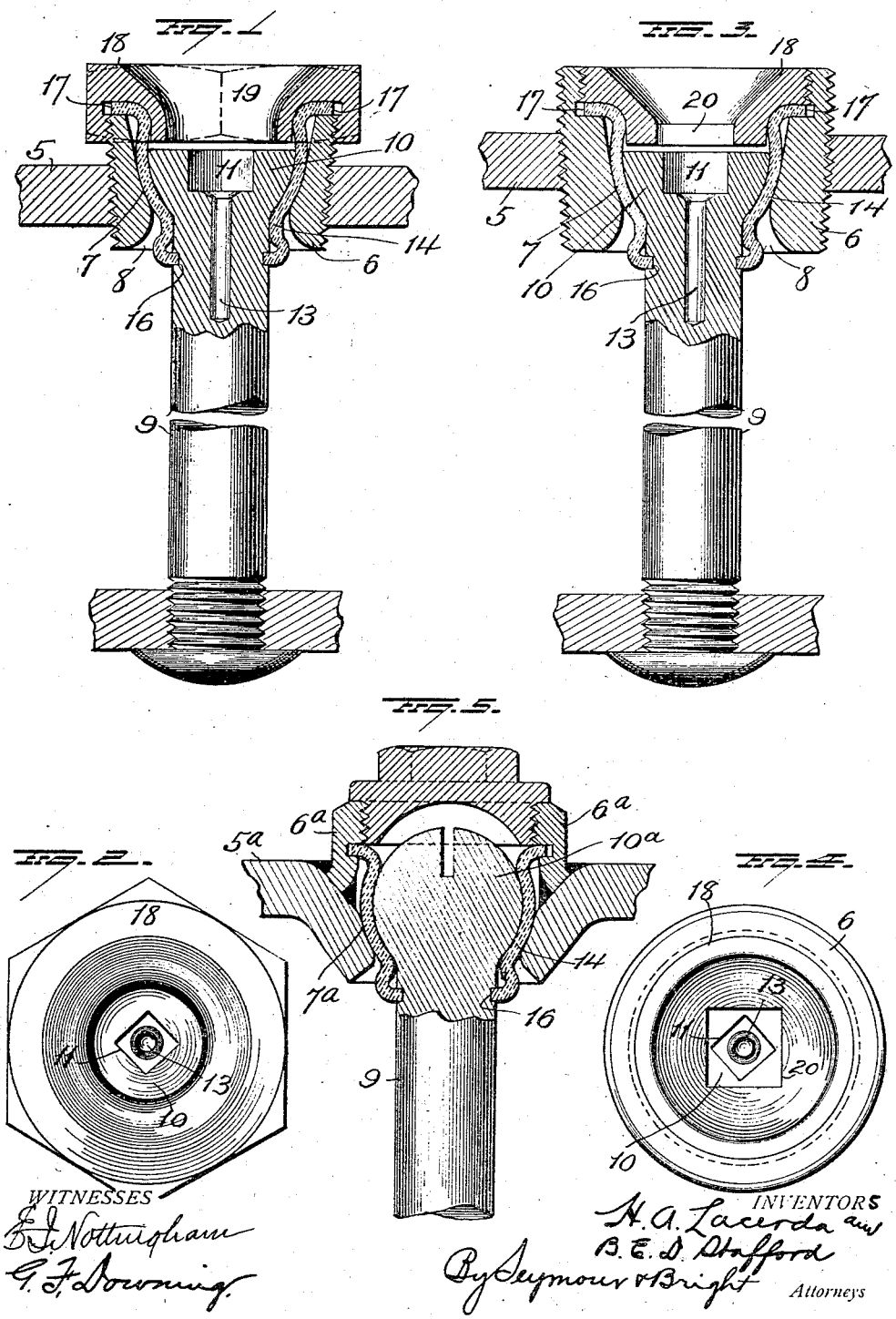

HARRY ANTHONY LACERDA, OF SCHENECTADY, NEW YORK, AND BENJAMIN E. D. STAFFORD, OF PITTSBURGH, PENNSYLVANIA, ASSIGNORS TO FLANNERY BOLT COMPANY, OF PITTSBURGH, PENNSYLVANIA.

FLEXIBLE STAY-BOLT.

1,285,245.      Specification of Letters Patent.      Patented Nov. 19, 1918.

Application filed November 8, 1917. Serial No. 200,952.

*To all whom it may concern:*

Be it known that we, HARRY ANTHONY LACERDA, of Schenectady, in the county of Schenectady and State of New York, and BENJAMIN E. D. STAFFORD, of Pittsburgh, in the county of Allegheny and State of Pennsylvania, have invented certain new and useful Improvements in Flexible Stay-Bolts; and we do hereby declare the following to be a full, clear, and exact description of the invention, such as will enable others skilled in the art to which it appertains to make and use the same.

This invention relates to an improvement in flexible stay bolts, the object being to provide means that will not interfere with the movements of the head of the bolt, for preventing any leakage of steam or water between said head and its seat, and the invention consists in the parts and combinations of parts and in the details of construction as will be more fully described and pointed out in the claims.

In the accompanying drawings; Figure 1 is a view in section of our improvement; Fig. 2 is a plan view of the same; Fig. 3 is a view similar to Fig. 1 of a modified form; Fig. 4 is a plan view of the same and Fig. 5 is a view partly in section and partly in elevation of another modification.

5 represents the outer sheet of a boiler and 6 a sleeve or plug threaded externally and screwed into the said sheet. This sleeve is provided internally with a curved seat 7, and the inner end of the bore of the sleeve immediately below the seat 7, is made tapering, or curved outwardly as shown at 8, so as to permit of a free rocking movement of the bolt on its seat.

The bolt 9 is provided at its outer end with a head 10, rounded or curved on its underside to conform to the curvature of the seat 7 and preferably flat on top, its outer flat face being provided with an angular socket 11, for the insertion of a wrench or other tool by which the bolt may be turned to screw its inner end into a threaded opening in the inner sheet, and also with a telltale bore 13 which opens into the wrench socket 11.

Mounted within the sleeve or plug 6 is the copper bushing 14. This bushing closely embraces the curved surface of the head 10 of the bolt, and the portion of said bushing at the inner side of the bolt head is bent outwardly and inwardly, and the extreme end secured to the bolt preferably by welding or brazing so as to absolutely prevent the passing of any steam or water between the bushing and the bolt head. We prefer to provide the bolt with a circumferential recess 16 as shown to receive the end of the bushing and then braze or weld the said end within the slot.

The outer end of the bushing is turned outwardly to form the flange 17 which rests on the shoulder formed by the outer end of the sleeve 6 thus forming a gasket for the cap 18, which may be provided with internal threads to engage external threads on the sleeve or plug, as shown in Fig. 1, or with external threads to engage internal threads in the sleeve or plug as shown in Fig. 3, the latter construction being adapted when flush bolts are desired or needed, while the construction shown in Fig. 1 is for use with projecting bolts. In the construction shown in Fig. 1, the outer end of the sleeve forms the shoulder for the outwardly projecting flange 17 of the bushing, while in Fig. 3 this shoulder is formed between the curved seat and internal cap threads on the sleeve. By securing the upper end of the bushing between the cap and the sleeve or plug, a steam and water tight joint is formed which prevents the escape of either around the outside of the bushing.

The cap 18 is provided with a central opening 19 through which the head of the bolt may be inspected and which will permit of the free passage of steam or water from the tell tale 13, in the event the bolt should break.

In the construction shown in Fig. 1, the cap 18 is provided with an angular outer edge for the attachment of a wrench, while in the flush bolt construction shown in Fig. 3 the hole 20, in the center of the cap is made angular to receive a wrench or other tool by which the cap may be turned.

With this construction the open cap tightly seals the outer end of the bushing, while the brazed or welded connection between the bolt and the bushing at the inner end of the latter makes a water and steam tight joint at this point. The bushing is free between its extremes so that it may give or yield to accommodate itself to the movements of the bolt head, which movement or flexibility is further provided for by the U-bend in the bushing adjacent its inner end.

In the construction shown in Fig. 5, the sleeve $6^a$ is welded to the boiler sheet, and the seat $7^a$ for head $10^a$ of the bolt is formed on the boiler sheet $5^a$ within the sleeve. In other respects the construction is substantially identical with that shown in the other figures.

It its evident that many slight changes might be resorted to in the relative arrangement of parts shown and described without departing from the sprit and scope of our invention. Hence we would have it understood that we do not wish to confine ourselves to the exact construction and arrangement of parts shown and described, but Having fully described our invention what we claim as new and desire to secure by Letters-Patent, is:—

1. In flexible stay bolts, the combination of a sleeve having a central seat, a bolt having a rounded head, a bushing interposed between the bolt head and the seat and forming a steam and water tight joint at its inner end around the bolt, the upper end of said bushing resting on a shoulder on the sleeve and a cap secured to the sleeve and clamping the upper end of the bushing between the cap and shoulder of the sleeve.

2. In flexible stay bolts, the combination of a sleeve having a curved seat, a bolt having a rounded head, a bushing interposed between the bolt head and the seat and secured at its inner end to the bolt so as to form a steam and water tight joint, the upper end of said bushing resting on a shoulder on the sleeve and a cap secured to the sleeve and clamping the upper end of the bushing between the cap and sleeve.

3. In flexible stay bolts, the combination of a sleeve having a curved seat, a bolt having a rounded head, and a yieldable bushing interposed between said seat and bolt head and secured at its inner end to the bolt and at its outer end to the sleeve.

4. In flexible stay bolts, the combination of a sleeve having a curved seat and a shoulder, a bolt having a rounded head, a yieldable bushing interposed between said seat and bolt head, the said bushing having an inwardly projecting inner end secured to the bolt and an outwardly projecting flange at its outer end to engage the shoulder on the sleeve and means for clamping said outwardly projecting flange against said shoulder.

5. In flexible stay bolts, the combination of the outer sheet of a boiler, a sleeve, a seat for a bolt head, a bolt having a rounded head, and a yielding bushing interposed between said seat and bolt head and secured at its inner end to the bolt and at its outer end to said sleeve.

6. In flexible stay bolts, the combination of a sleeve secured to an outer sheet of a boiler, a seat for a bolt head, a bolt having a rounded head and a yielding bushing interposed between said seat and head, and welded at its inner end to the bolt and secured at its outer end to the sleeve, so as to form a steam tight joint between the bolt and bushing and between the bushing and sleeve.

7. In flexible stay bolts, the combination of a sleeve secured to an outer sheet of a boiler, a bolt having a rounded head, a seat within the sleeve for the bolt head, and a yieldable bushing interposed between said seat and bolt head, the said bushing being bent or corrugated near its inner end, and secured at its inner end to the bolt and at its outer end to the sleeve.

8. In flexible stay bolts, the combination of a sleeve secured to an outer sheet of a boiler, a bolt having a rounded head, a seat within the sleeve for the bolt head, a yieldable bushing interposed between the seat and bolt head and welded or brazed at its inner end to the bolt and provided at its outer end with an outwardly projecting flange and a cap for clamping the flange of the bushing to a shoulder on the sleeve.

9. In flexible stay bolts, the combination of a sleeve secured to an outer sheet of a boiler, a bolt having a rounded head, a seat within the sleeve for the bolt head, a yieldable bushing interposed between the seat and head, the said bushing having a U-bend adjacent its inner end and secured at its inner end to the bolt so as to form a steam tight joint with the latter, and provided at its outer end with an outwardly projecting flange, and a cap for clamping said flange against a shoulder on the sleeve.

10. In flexible stay bolts the combination of a sleeve secured to an outer sheet of a boiler, a bolt having a rounded head and a circumferential recess adjacent the head, a seat within the sleeve for the bolt head, a yieldable bushing between the seat and head, the inner end of said bushing being bent or turned inwardly, and the said bent end being permanently secured within the slot in the bolt, the outer end of said bushing being bent outwardly, and a cap for clamping said outwardly projecting end against a shoulder on the sleeve.

11. In flexible stay bolts, the combination of a sleeve, a seat for a bolt head, a bolt having a rounded head and a tell tale bore, a yieldable bushing interposed between said seat and bolt head and secured at its inner end to the bolt, and a cap open at its center and clamping the outer end of said bushing against a shoulder on the sleeve.

In testimony whereof, I have signed this specification in the presence of two subscribing witnesses.

HARRY ANTHONY LACERDA.

Witnesses:
ALBERT GRUSSNER,
HERMAN FREED.

In testimony whereof, I have signed this specification in the presence of a subscribing witness.

BENJAMIN E. D. STAFFORD.

Witness:
EDWIN S. RYCE.

Copies of this patent may be obtained for five cents each, by addressing the "Commissioner of Patents, Washington, D. C."